US011117527B2

United States Patent
Cao et al.

(10) Patent No.: US 11,117,527 B2
(45) Date of Patent: Sep. 14, 2021

(54) ACTUATOR FOR MOVEABLE SENSOR FOR AUTONOMOUS DRIVING

(71) Applicant: Faraday&Future Inc., Gardena, CA (US)

(72) Inventors: Chi Hung Cao, Huntington Beach, CA (US); Hong S. Bae, Torrance, CA (US); Richard S. Kim, Los Angeles, CA (US); Jan Becker, Palo Alto, CA (US)

(73) Assignee: Faraday&Future Inc., Gardena, CA (US)

( * ) Notice: Subject to any disclaimer, the term of this patent is extended or adjusted under 35 U.S.C. 154(b) by 325 days.

(21) Appl. No.: 16/092,206

(22) PCT Filed: Apr. 1, 2017

(86) PCT No.: PCT/US2017/026722
§ 371 (c)(1),
(2) Date: Oct. 8, 2018

(87) PCT Pub. No.: WO2017/177206
PCT Pub. Date: Oct. 12, 2017

(65) Prior Publication Data
US 2020/0331407 A1    Oct. 22, 2020

Related U.S. Application Data

(60) Provisional application No. 62/320,390, filed on Apr. 8, 2016, provisional application No. 62/402,875, filed on Sep. 30, 2016.

(51) Int. Cl.
*B60R 11/04* (2006.01)
*H04N 5/225* (2006.01)
*B60R 11/00* (2006.01)

(52) U.S. Cl.
CPC .......... *B60R 11/04* (2013.01); *H04N 5/2252* (2013.01); *B60R 2011/004* (2013.01);
(Continued)

(58) Field of Classification Search
None
See application file for complete search history.

(56) References Cited

U.S. PATENT DOCUMENTS

| 5,101,927 A * | 4/1992 | Murtuza | B60T 7/22 180/275 |
| 2015/0298740 A1* | 10/2015 | Winberg | B62D 21/152 296/187.09 |
| 2015/0360619 A1* | 12/2015 | Barthel | B60R 11/04 348/148 |

FOREIGN PATENT DOCUMENTS

| KR | 20-0212160 Y1 | 2/2001 |
| KR | 20-0412183 Y1 | 3/2006 |

OTHER PUBLICATIONS

International Search Report dated Aug. 4, 2017 for International Application No. PCT/US2017/026722.

* cited by examiner

*Primary Examiner* — James M Anderson, II
(74) *Attorney, Agent, or Firm* — Veros Legal Solutions LLP

(57) ABSTRACT

Various techniques related to a sensor for use with autonomous driving and/or navigation of a vehicle. The techniques can include use of an elongated threaded member, an intermediate threaded member, and a tertiary member. The members can be operable to extend or retract a vehicle sensor on a platform. The members can also enable the sensor to retract upon application of a force external to the vehicle.

20 Claims, 13 Drawing Sheets

(52) U.S. Cl.
CPC .......... *B60R 2011/0082* (2013.01); *B60R 2011/0084* (2013.01); *B60R 2011/0092* (2013.01); *B60R 2300/8093* (2013.01)

Receive indication to extend navigation sensor
502

Induce an element to move to a first spatial location
504

Receive indication to retract the navigation sensor
508

Induce the element to move to a second spatial location
510

ACTUATOR FOR MOVEABLE SENSOR FOR AUTONOMOUS DRIVING

CROSS-REFERENCE TO RELATED APPLICATIONS

The present application is a National Phase application under 35 U.S.C. § 371 of International Application No. PCT/US2017/026722, filed Apr. 7, 2017, which claims the benefit of U.S. Provisional Application No. 62/320,390, filed Apr. 8, 2016, and U.S. Provisional Application No. 62/402,875, filed Sep. 30, 2016, the contents of each of which are hereby incorporated by reference.

BACKGROUND

Sensors are becoming more widely and prevalently used in vehicles, such as automobiles, for various purposes including navigation, providing driver aids, and for partial or full autonomous driving systems. Integration of sensors presents into automobiles can present several challenges related to safety and reliability of sensor systems. For example, such sensor systems may become a safety concern due to impacts with pedestrians, debris, or other objects that may impact an automobile or may be impacted by an automobile.

SUMMARY

The present disclosure describes various techniques that relate to extending a sensor platform for a vehicle. Disclosed are techniques for extending a sensor platform for a vehicle, comprising. The techniques can include an elongated threaded member characterized by an axis of elongation, wherein a thread of the elongated threaded member at least partially circumvents the axis of elongation. The techniques can also include an intermediate threaded member including a thread mechanically engaged with the thread of the elongated threaded member, wherein the thread of the intermediate threaded member is substantially complementary to the thread of the elongated threaded member. The intermediate threaded member can be rotated and the elongated threaded member can translationally move along the axis of elongation relative to the intermediate threaded member when the intermediate threaded member is held captive from moving translationally in a direction parallel to the axis of elongation. When a translational force is applied to the elongated threaded member in the direction parallel to the axis of elongation, both of the elongated threaded member and the intermediate threaded member can displace, relative to the vehicle, translationally in the direction parallel to the axis of elongation.

The techniques can further include a tertiary member including a surface that is configured to engage a surface of the intermediate threaded member, wherein the surface of the tertiary member is complementary to the surface of the intermediate threaded member. When the translational force is applied to the elongated threaded member in the direction parallel to the axis of elongation, the tertiary member can displace, relative to the intermediate threaded member, translationally in the direction parallel to the axis of elongation. When the intermediate threaded member is rotated, the tertiary member can rotates substantially unitarily with the intermediate threaded member. The intermediate threaded member can include an inner surface that defines an orifice through which the elongated member can pass to engage the thread of the elongated threaded member with the thread of the intermediate threaded member. The tertiary member can include an inner surface that defines an orifice through which the intermediate threaded member can pass to engage the surface of the elongated threaded member with the surface of the intermediate threaded member.

The techniques can further include a biasing element configured to bias the tertiary member relative to the intermediate threaded member in the direction parallel to the axis of elongation to engage the surface of the intermediate threaded member with the surface of the tertiary member. The elongated threaded member can be coupled to a platform including a sensor operable to provide information for autonomous navigation of the vehicle. The techniques can include an applique configured to form a portion of an exterior surface of the vehicle when the sensor is retracted to the second spatial location. The techniques can also include a sacrificial element wherein, when the application of the force to the elongated threaded member in the direction parallel to the axis of elongation exceeds a threshold, the sacrificial element can destructively deform prior to destructive deformation of other components. The techniques can additional include a biasing element configured to bias the elongated threaded member to a spatial location relative to the vehicle in the direction parallel to the axis of elongation when the force to the elongated threaded member in the direction parallel to the axis of elongation does not exceed the threshold. The techniques can also include a motor coupled to the intermediate threaded member and configured to rotate the tertiary member around an axis parallel to the axis of elongation.

The thread of the elongated threaded member and the thread of the intermediate threaded member can form respective complementary spirals in a direction parallel to the axis of elongation. The techniques can include a sensor configured to sense a physical property corresponding to a degree of extension of the elongated threaded member along the axis of elongation. A cross-sectional shape formed by the surface of the intermediate threaded member can be polygonal. The techniques can also include a controller configured to extend or retract the elongated threaded member along the axis of elongation based on the degree of extension of the elongated threaded member determined via the sensor.

Disclosed are techniques for elevating a sensor platform for an automobile. The techniques can include a means to rotate an intermediate threaded member that at least partially surrounds an elongated threaded member characterized by an axis of elongation. The techniques can also include a means to, upon rotation of the intermediate threaded member, extend the elongated threaded member in a direction along the axis of elongation. The techniques can further include a means to, upon application of a force to the elongated threaded member in a direction along the axis of elongation, decouple the means to extend the elongated threaded member from the means to rotate the intermediate threaded member.

The techniques can further include a means to bias the means to extend the elongated threaded member to be coupled to the means to rotate the intermediate threaded member. The means to bias the elongated threaded member to be coupled to the means to rotate the intermediate threaded member can couple the means to extend the elongated threaded member to the means to rotate the intermediate threaded member when the force is applied to the elongated threaded member in a direction along the axis of elongation that does not meet a threshold. The techniques can further include a means to destructively decouple the device from an exterior element if the force meets the threshold.

BRIEF DESCRIPTION OF THE DRAWINGS

The disclosure will be readily understood by the following detailed description in conjunction with the accompanying drawings, wherein like reference numerals designate like structural elements, and in which.

Figure 1A:
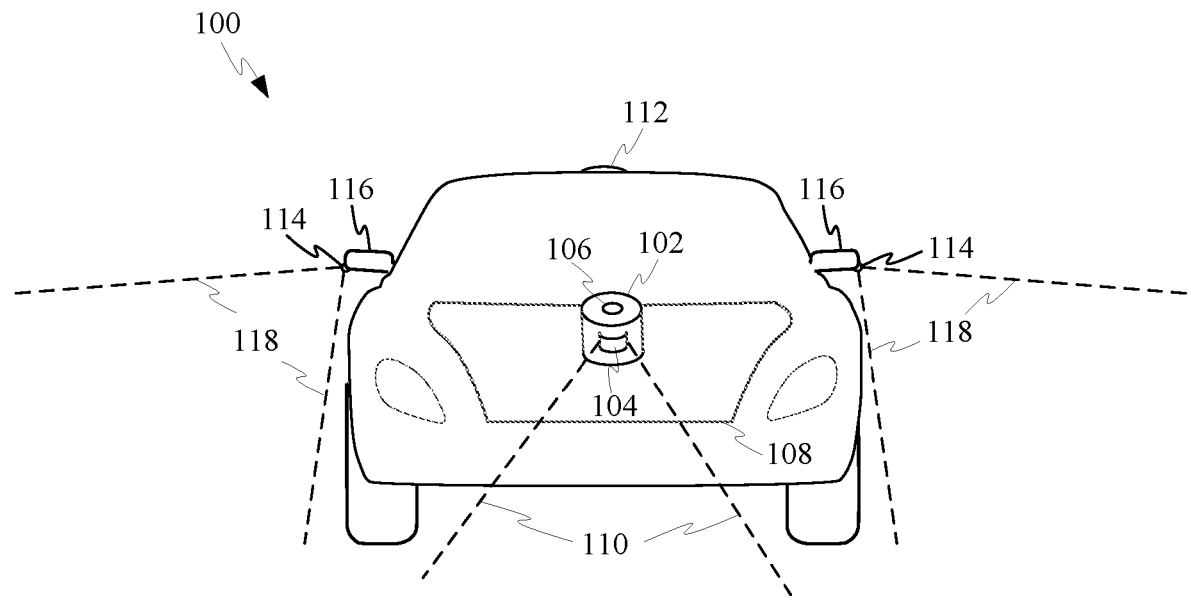
FIGS. 1A and 1B illustrate an example vehicle including a sensor according to certain embodiments.

Other aspects and advantages of the invention will become apparent from the following detailed description taken in conjunction with the accompanying drawings which illustrate, by way of example, the principles of the described embodiments.

DETAILED DESCRIPTION

This description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the invention is not limited to the embodiments shown, but is to be accorded the widest scope consistent with the principles and features disclosed herein.

Sensor systems for detecting stimuli external to a vehicle are becoming increasingly useful for automobiles and other vehicles as the vehicles are becoming increasingly outfitted with driving aids and autonomous driving systems. Example sensors include LIDAR (Light Detection And Ranging), ultrasonic, imaging cameras, radio transducer(s), other wave detecting sensors, or a combination of the preceding. The sensors can be used to obtain environmental information from outside of a vehicle to aid in navigation of the vehicle. For example, the sensors can be used to image and characterize a roadway, obstacles, pedestrians, other vehicles, or other such information that can be used for navigation of a vehicle. The sensors can be used with a Heads Up Display (HUD) or other such displays to provide enhanced situational awareness to a vehicle operator. The sensors can be used to provide information to partial or full autonomous driving systems of a vehicle to enable the vehicle to partially or fully operate without direct user commands.

The sensors discussed herein for navigation of a vehicle can have significant physical dimensions. Furthermore, the sensors can comprise sensitive components prone to damage upon impact. According to embodiments of the present disclosure, the sensors can integrate into an automobile or other vehicle by being mounted on a movable platform that extends or retracts from the exterior of the vehicle. For example, when a user engages an autonomous driving feature of a vehicle, the sensors may extend to be positioned at a spatial location wherein the sensors are operable to sense external stimuli useful for navigation of the vehicle. When the autonomous driving feature is disengaged, the sensors can retract into the vehicle and be located at a spatial location to shield the sensors from external debris and/or to improve aesthetic or aerodynamic properties of the vehicle.

Because the sensors may be relatively fragile and/or massive, they may present special dangers to pedestrians, bystanders, and operators of vehicles. For example, impact to a LIDAR sensor array by a golf ball or other object may result in destructive fragmentation of components of the LIDAR sensor array (such as broken and fragmented glass). Furthermore, the protrusion of the sensors from the exterior of a vehicle can create a snag point or impact danger to a pedestrian that is impact by the vehicle. For example, without such a protrusion, an impact with a pedestrian may be spread over a relatively large surface area (such as a hood of a car). However, the same impact with a sensor protruding from the vehicle may concentrate the force into a relatively small area and may be more likely to harm a pedestrian. Aspects of the disclosure regard increasing safety associated with use of sensor systems on vehicles through use of moveable platforms that can cushion or otherwise retract into the vehicle.

These and other embodiments are discussed below with reference to FIGS. 1-8, however, those skilled in the art will readily appreciate that the detailed description given herein with respect to these figures is for explanatory purposes only and should not be construed as limiting.

Figure 1B:
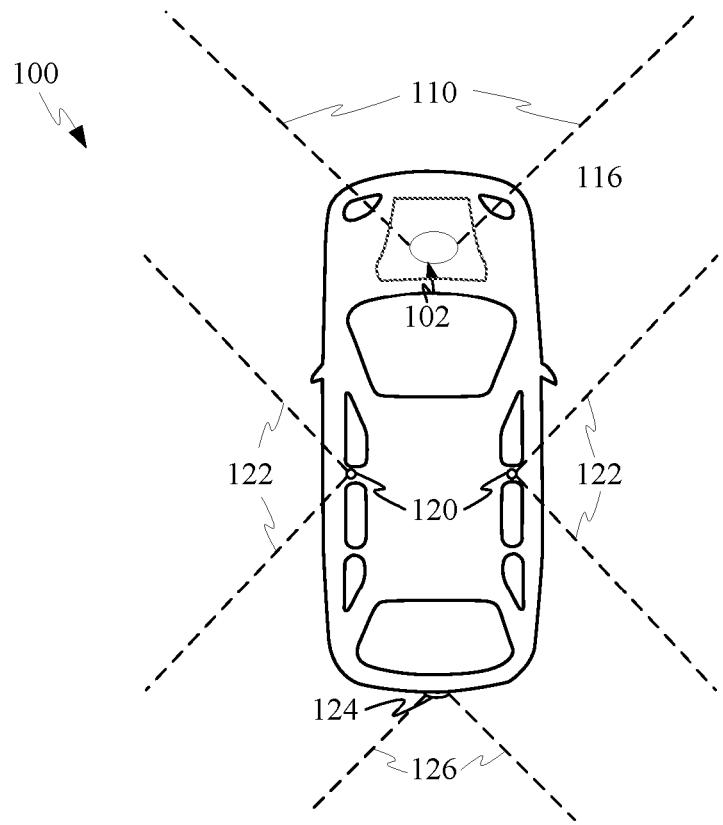

FIGS. 1A-1B show external views of an exemplary vehicle 100 illustrated as an automobile suitable for carrying passengers from one location to another. Vehicle 100 can be powered by any number of powertrain types including, e.g., an internal combustion engine and/or an electric motor. FIG. 1A shows a front view of a vehicle 100 and the position of various sensors associated with vehicle 100. In particular, a sensor is illustrated as a component of a sensor housing 102 that can include moveable platform(s). Moveable platform(s) can extend from a body panel of vehicle 100, such as hood 108. When operating in a partial or full autonomous driving mode, sensor housing 102 can extend from vehicle 100 to provide the sensor with a field of view 110 external to the vehicle. The field of view 110 can be through opening 104 of sensor housing 102. As illustrated, sensor housing 102 can at least partially encapsulate the sensor even when extended from the vehicle and provide protection from debris, weathering, and other conditions. A portion of sensor housing 102 can retract into vehicle 100 to provide further protection of the sensor, such as when vehicle 100 is not operating in an autonomous driving mode and therefore may not require input from the sensor. Also illustrated is a light 106 that can be included on sensor housing 102. Light 106 may illuminate when sensor housing 102 is extended to, for example, alert other drivers or pedestrians that vehicle 100 is operating in an autonomous mode.

Also illustrated are various other positions for mounting sensor(s) operable for aiding vehicle 100 in navigation or autonomous driving. For example, sensor 112 is placed atop vehicle 100. In certain embodiments, vehicle 100 also includes lateral sensors 114 mounted on rear view mirrors 116 or other locations on lateral sides of vehicle 100. Lateral sensors 114 can have a field of view 118 for detecting objects adjacent to vehicle 100. Each of sensors 112 or 114 can be mounted on a moveable platform similar to sensor housing 102 to enable the sensors to extend or retract from vehicle 100.

FIG. 1B illustrates a top view of vehicle 100 and various example positions of sensors for use with vehicle navigation or autonomous driving. Lateral sensors 120 are depicted as being located on a column (e.g., "B pillar") between side windows of vehicle 100. Lateral sensors 120 can be positioned to have fields of view 122. Vehicle 100 can also include sensor 124 for monitoring a field of view 126 behind vehicle 100. In this way, different areas around vehicle 100 can be monitored. It should be appreciated that each of the illustrated sensors are provided for exemplary purposes, and additional sensors and/or differing fields of view can be applied to vehicle 100. Each of the sensors can be located on a retractable platform that can extend from a corresponding exterior body panel of vehicle 100. The platforms can include appliques such that, when the platforms are retracted, the appliques form exterior components of vehicle 100 to form a substantially seamless and aerodynamic exterior body surface.

In some embodiments, the depicted sensors can be configured to capture and characterize different spectrums of light within an associated field of view. For example, visible, infrared, near infrared and/or ultraviolet wavelengths of light can be collected by sensors in order to more clearly track and characterize particular objects. Furthermore, in some embodiments, two or more sensors can have overlapping coverage that can allow for three dimensional characterization of objects. The overlapping coverage can result from comparing imagery of the same object taken at the same time or from consecutively captured imagery. For example, forward-looking sensor 116 could capture an image of an object and then as vehicle 100 passes by the object one of lateral sensors 104 and/or 112 could gather additional imagery/sensor readings helping to characterize an object. The depicted sensors could include radar or laser based distance determining sensors configured to identify the presence of roadway obstructions or help in collision avoidance. The distance determining sensors could also be used in creating new map data as measurements taken can be correlated to associated map data. In some embodiments, laser-based distance determining sensors could determine the shape of a three dimensional structure, which could be subsequently added to map data where highly accurate contour and/or position information was desired.

Figure 2A:
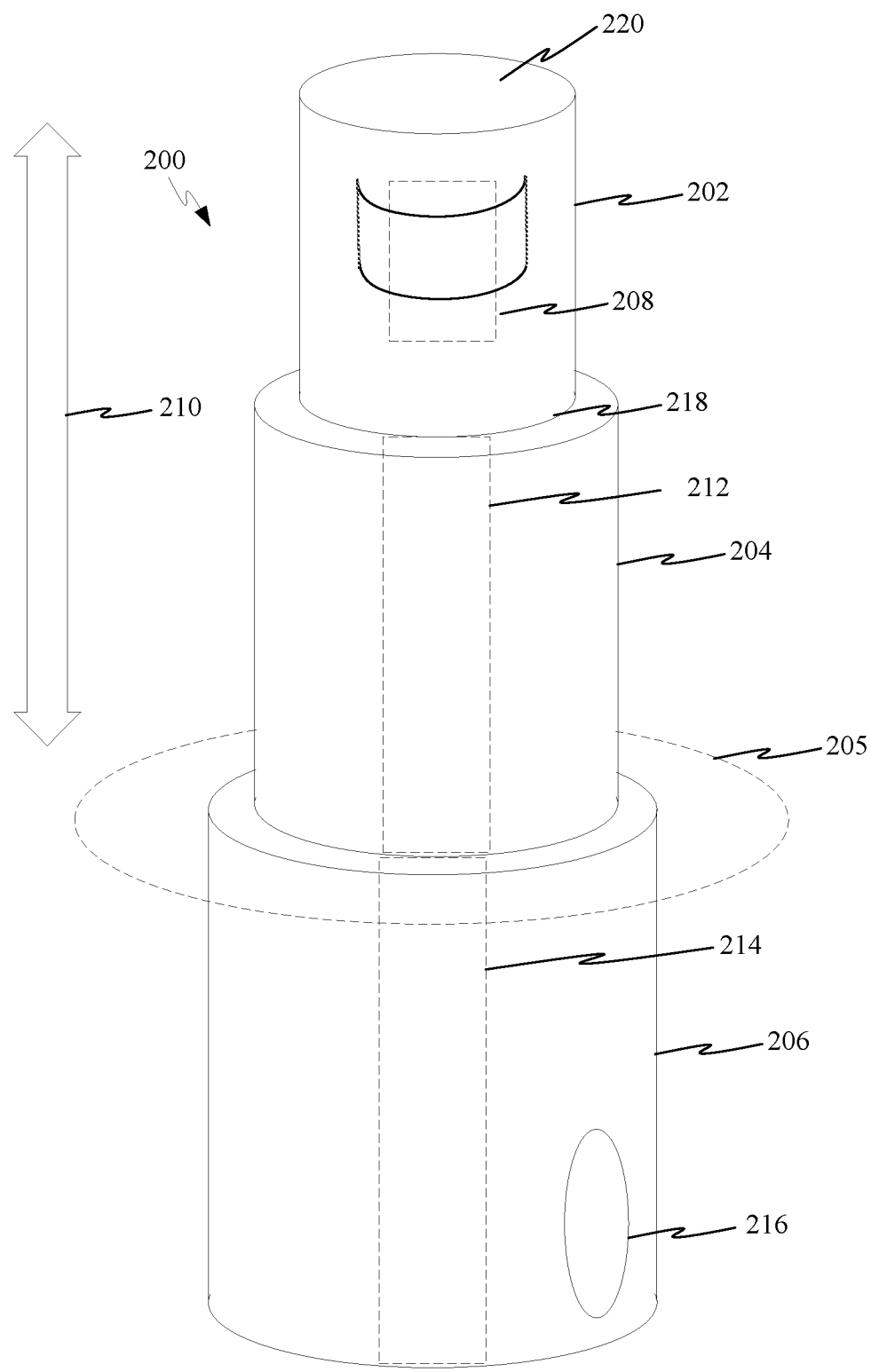
FIGS. 2A-2C illustrate a sensor platform according to certain embodiments.

FIG. 2A illustrates a system 200 that can be implemented as a sensor housing including moveable platform(s). System 200 can include a sensor 208 and several moveable elements 202 and 204. Each of elements 202 and 204 can move independently relative to each other by retracting into or from element 206 in direction of arrow 210. Element 206 can be fixedly attached to the vehicle including vehicle body panel 205. In certain embodiments, element 206 can be fixedly attached to a frame portion of the vehicle (not shown) and/or a flexible seal can couple system 200 to vehicle body panel 205 to allow at least a portion of system 200 to extend through and form a weather-proof seal with vehicle body panel 205 when sensor 208 is retracted. Also, the flexible seal can allow vehicle body panel 205 to be moved relative to system 200 (for example, if vehicle body panel 205 is a moveable hood) even if system 200 is retracted, for example. Sensor 208 can be operable to provide information to a navigation and/or autonomous driving system (not shown) of a vehicle. Sensor 208 can be housed within a cavity defined by element 202. Element 204 can define a cavity that can be used to house element 202 when element 202 retracts into element 204. Thus, element 202 can retract into element 204 such that element 204 at least partially encapsulates element 202 to protect element 202 and sensor 208.

Figure 2B:
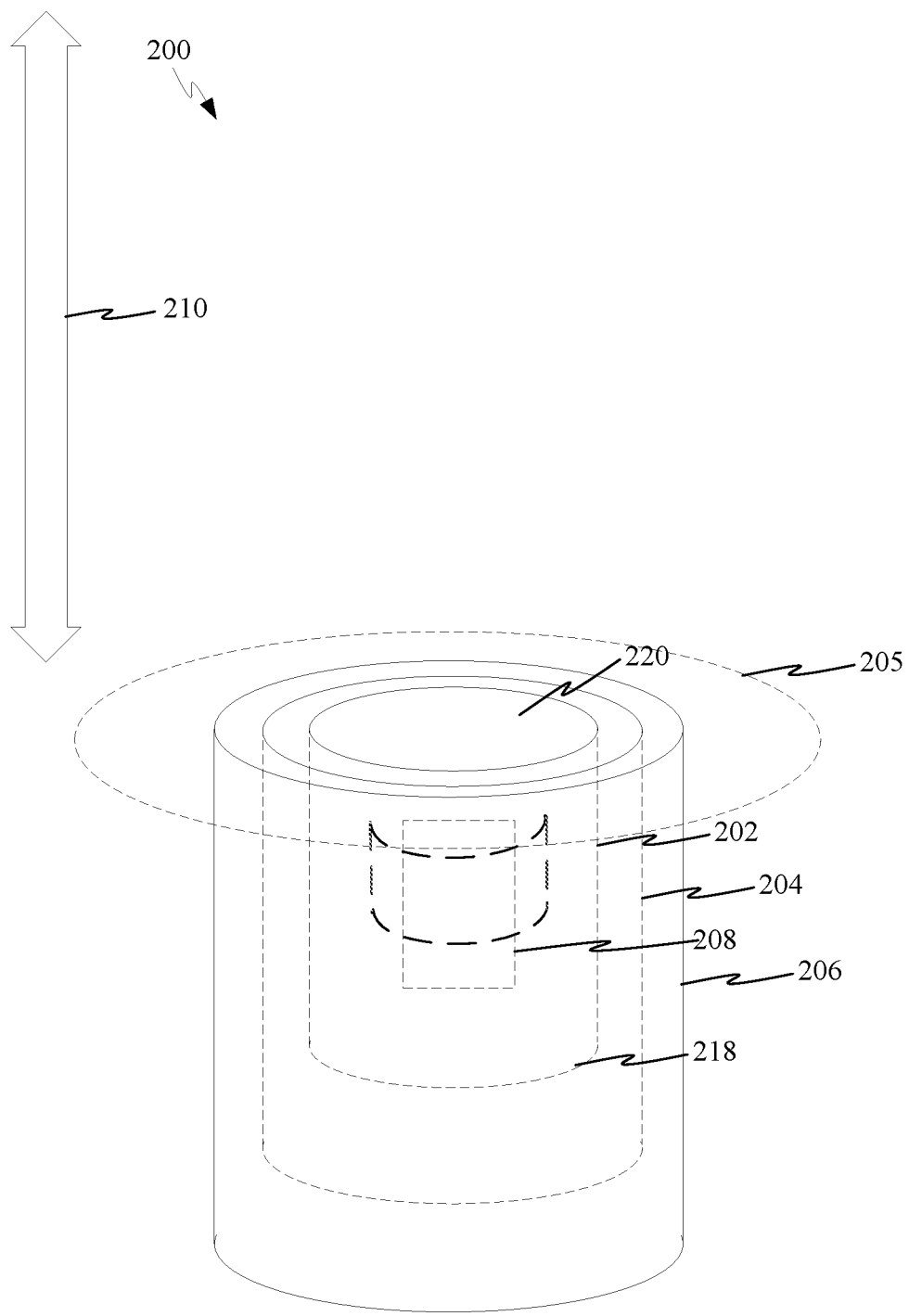

FIG. 2A illustrates a state of system 200 wherein elements 202 and 204 are fully extended. In the state of system 200 illustrated, sensor 208 can be positioned at a spatial location to receive information from outside of the vehicle including vehicle body panel 205 for use in navigation or autonomous driving of the vehicle. For example, system 200 can be positioned to extend through a hood of a vehicle as illustrated in FIG. 1. FIG. 2B illustrates a state of system 200 wherein sensor 208 is positioned in at a spatial location to inhibit receiving information from outside of the vehicle including vehicle body panel 205. In the state illustrated by FIG. 2B, sensor 208 can be housed with elements 202, 204, and 206 to protect sensor 208 from weathering effects or debris external to a vehicle. Element 202 (and/or element 204) can include a floor 218 and an applique 220. Applique can be contoured, colored, texture, and/or otherwise by physically configured to substantially correspond to surrounding vehicle features of vehicle body panel 205. When element 202 is retracted, as illustrated in FIG. 2B, applique 220 can form a portion of an exterior of vehicle to improve aerodynamic effects of the vehicle including vehicle body panel 205 and/or improve aesthetics of the vehicle.

Figure 2C:
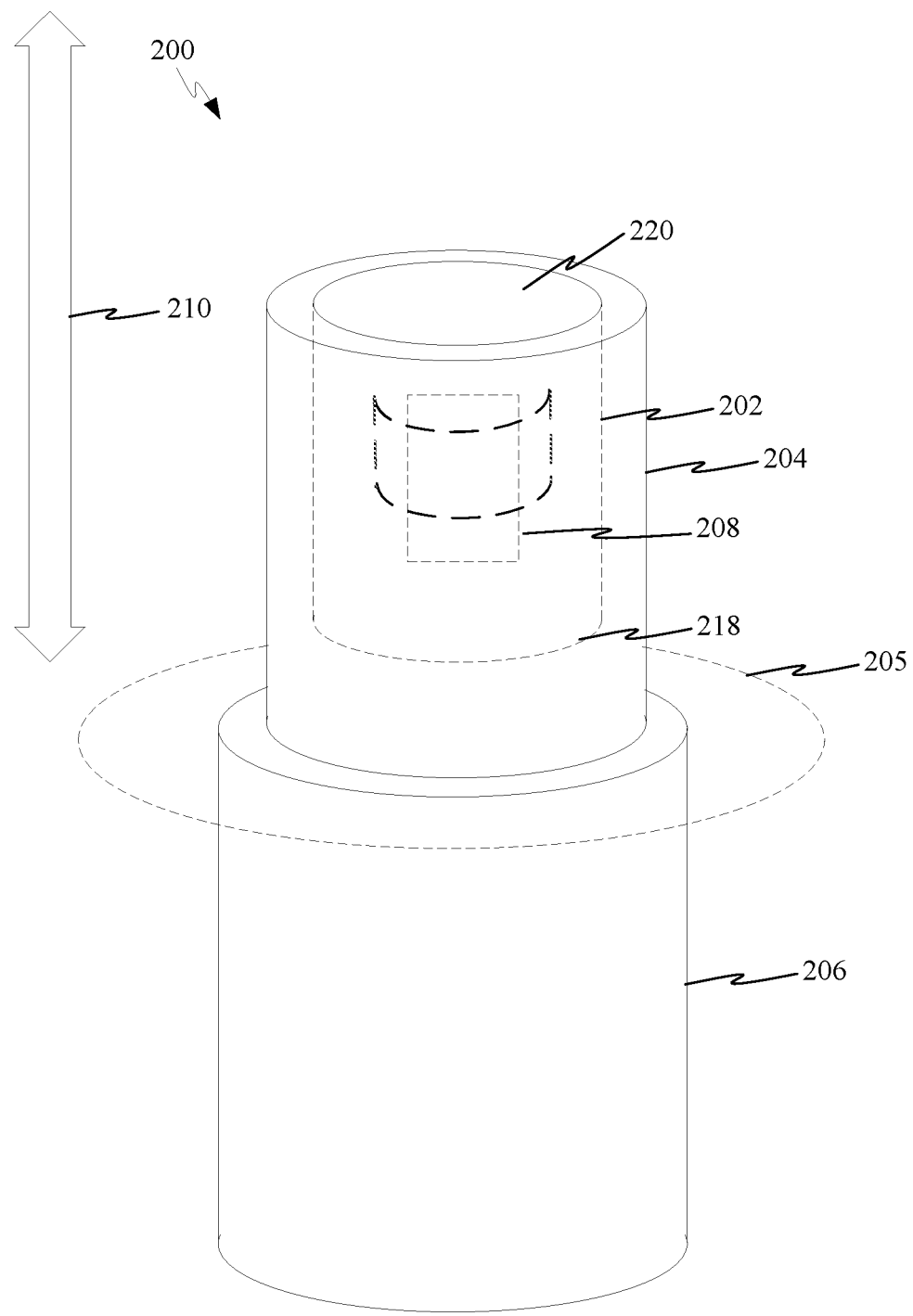

FIG. 2C illustrates a state of system 200 wherein element 202 is retracted into a cavity of element 204. However, element 204 is not retracted into a cavity of element 206. The state of system 200 illustrated in FIG. 2C can be entered to relatively quickly retract and/or shield sensor 208 inside of element 204 to protect sensor 208 from damage. For example, a spring loaded, vacuum, or other mechanism can be induced to retract the sensor. Furthermore, the configuration shown in FIG. 2C can be used to shield pedestrians or other objects, such as when a determination is made that an impact between the vehicle and the pedestrian or object is imminent. For example, element 204 can encapsulate element 202 and sensor 208 to prevent shrapnel from fragmentation of sensor 208 that may be hazardous to bystanders/pedestrians. Such a determination can be made by a controller, by example, based on sensor data or other information.

Each of elements 202 and 204 can be actuated between states by independent actuators and/or by a single actuator. Actuators 212 and 214 are illustrated in FIG. 2A. In certain embodiments, one or more actuators (such as actuators 212 and 214) can be used to move element 202 or element 204 using a compressible fluid, such as a gas. For example, actuator 212 and/or actuator 214 can include an air bladder or piston that can be pressured with a compressible fluid to extend actuator 212 or 214 (and a corresponding element/sensor). In certain embodiments, elements 202, 204, or 206 can be used to form one or more pistons. For example, a seal (not shown) can be used to form a substantially fluid-tight bond between element 204 and element 206. Thus, fluid that is pressurized within element 206 can "push" element 204, causing element 204 to extend from element 206. Elements 202 and 204 can similarly be used to form a fluid piston.

Compressible fluid actuators and/or buffers can be used as dampeners to protect system 200 and/or pedestrians/objects external to the vehicle from damage. For example, if a force is applied externally to system 200 (by impact with a pedestrian or an object such as a baseball, for example), the force can cause the compressible fluid to compress. After the force is removed, the compressible fluid can decompress and the system 200 can return to its state prior to the impact. Thus, compressible fluid can be used to form a dampener cushioning system 200 from external forces or external objects from impact with a vehicle. In certain embodiments, fixed compressible fluid dampeners can be used that do not actuate element 202 or element 204. Fixed dampeners may utilize a fixed volume compressible fluid reservoir and may form a relatively more reliably sealed compartment as compared to a variable volume compressible fluid actuator. However, a variable volume compressible fluid actuator may provide a compact form factor when the compressible fluid is evacuated (such as when an element is retracted) by forgoing volume that would be taken by a reservoir for a fixed dampener.

In certain embodiments, a chemical reaction can be used to generate a compressible fluid to fill a bladder or other dampener. For example, upon determination that an impact with a pedestrian is imminent, a controller can initiate a chemical reaction to fill a dampener with a compressible fluid to cushion the impact. For example, a bladder can be positioned between element 202 and element 204 that is configured to be filled via a fluid produced by a chemical reaction.

Compressible fluid may be provided to a variable volume actuator by a dedicated compressor or may be provided by other vehicle compressor(s). For example, certain vehicles may include compressor(s) to provide pressured fluid to brake systems, suspension systems, climate control systems, and/or to provide air to an internal combustion engine. In certain embodiments, an internal combustion engine can be used itself as a fluid compressor and/or evacuator. In certain embodiments, a pressure release valve 216 can be used to more relatively quickly evacuate fluid from system 200 if, for example, a relatively large external force is applied to system 200 or an error causes an overpressure condition by over pressurizing an actuator. Release valve 216 can be operable to prevent damage to seals between elements (such as elements 202, 204, or 206) and/or other components of system 200.

In certain embodiments a controller (not illustrated) can be coupled to system 200 to command actuator(s) such as actuator 212 or 214 to extend or retract element 202 or 204 depending on various sensor readings. For example, the controller can determine that element 202 or 204 has been commanded to extend from a vehicle. One or more sensors can be operable to determine that extension of element 202 or 204 is inhibited (e.g., by a cat sitting on the sensor, by damage to the sensor, etc.). If the element(s) are inhibited, the controller can prevent actuator(s) 212 and/or 214 from actuating element 202 or 204 to prevent damage to the system. The controller can also indicate an error message accordingly. The one or more sensors can include an imaging sensor, a position sensor, a pressure sensor, a force sensor, or the like. In certain embodiments, vehicle body panel 205 can form a portion of a hood of a car. If so, the controller can determine that the hood has been closed. If the hood has been closed, the controller may command actuator(s) 212 and/or 214 to cycle element 202 or 204 to set a seal (not illustrated) of system 200 with vehicle body panel 205. In certain embodiments, the amount that sensor 208 is extended can be adjusted by a controller depending on, for example, a speed of a vehicle. The controller can also determine that the vehicle is or will be subjected to inclement weather such as hail that may damage sensor 208 and retract sensor 208 accordingly. In certain embodiments, sensor 208 may be prevented from extending if an ancillary system of the vehicle has failed (processor(s) for analyzing data gathered by sensor 208, for example). In certain embodiments, the controller can determine that a vehicle is entering a car wash a retract sensor 208 accordingly.

FIGS. 3A-3D illustrate features of the disclosure that can be utilized by certain embodiments. For example, the features illustrated can be included in system 200 of FIGS. 2A-2C (such as in actuators 212 or 214). FIGS. 3A-3D illustrate a system 300 including an element 302 and an element 306. Element 302 can define a cavity that can be used to house sensor 308. Sensor 308 can be similar to sensor 208. Sensor 308 can be extended or retracted from a vehicle similar to sensor 208 of system 200. System 300 includes an actuator 310.

Actuator 310 can include an elongated threaded member 312 characterized by an axis of elongation 313. A thread of the elongated member can at least partially circumvent the axis of elongation to, for example, form a spiral pattern along the elongated threated member 312. Actuator 310 can also include an intermediate threaded member 314. Intermediate threaded member 314 can include a complementary thread to the thread of elongated threaded member 312. The complimentary threads of the intermediate threaded member 314 can be located on an inner surface of intermediate threaded member 314. The inner surface of intermediate threaded member 314 can define an orifice through which elongated threaded member 312 can be inserted. When elongated threaded member 312 is inserted through orifice of intermediate threaded member 314, threads of elongated threaded member 312 can couple to and engage with complementary threads of intermediate threaded member 314. When elongated threaded member 312 is coupled to intermediate threaded member 314, rotation of either member can cause axial movement of a member along axis of elongation 313 (when the other member is held stationary). For example, while constraining intermediate threaded member 314 to prevent it from moving axially along axis of elongation 313, elongated threaded member 312 can be moved axially along axis of elongation 313 by rotating intermediate threaded member 314 around axis of elongation 313.

An outer surface of intermediate threaded member 314 can be configured to couple to an inner surface of tertiary member 316. The inner surface of tertiary member 316 can define an orifice through which intermediate threaded member 314 can be inserted to form a coupling between the outer surface of intermediate threaded member 314 and inner surface of tertiary member 316. In certain embodiments, in contrast to the coupling between elongated threaded member 312 and intermediate threaded member 314, the coupling between intermediate threaded member 314 and tertiary member 316 can enable intermediate threaded member 314 or tertiary member to move axially along axis of elongation 313. However, the coupling between intermediate threaded member 314 and tertiary member 316 can enable both intermediate threaded member 314 and tertiary member 316 to rotate in unison around axis of elongation 313.

An outer surface of tertiary member 316 can include teeth that can be coupled to a gear coupled to a motor 318. Furthermore, tertiary member 316 can be constrained from moving axially along axis of elongation 313. Thus, in certain embodiments, when motor 318 rotates, tertiary member 316 can be induced to rotate by interaction between teeth of an outer surface of tertiary member 316 and a gear of motor 318. When tertiary member 316 rotates, intermediate threaded member 314 can be induced to rotate correspondingly. When intermediate threaded member 314 rotates, elongated threaded member 312 can move axially along axis of elongation 313. Elongated threaded member 312 can be coupled to element 302 to extend or retract sensor 308. Thus, motor 318 can be controlled to actuate element 302 to position sensor 308 along axis of elongation 313 (e.g., to extend or retract sensor 308 with respect to a body of a vehicle).

When viewed along the axis of elongation, a cross-sectional view of the outer surface of intermediate threaded member 314 (and/or complimentary inner surface of tertiary member 316) can form a polygonal, organic, or other shape. The term complementary, as used herein, indicates that two surfaces or threads are opposing and interlocking. For example, complementary threads can mate to form a screw and nut type of combination wherein one member can rotate and traverse longitudinally along another member. As another example, complementary surfaces of elements can couple to form an interface that provides resistance. For example, two complementary surfaces of intermediate threaded member 314 and tertiary member 316 can enable the two members to move unitarily (rotationally and/or translationally, for example).

Figure 3A:
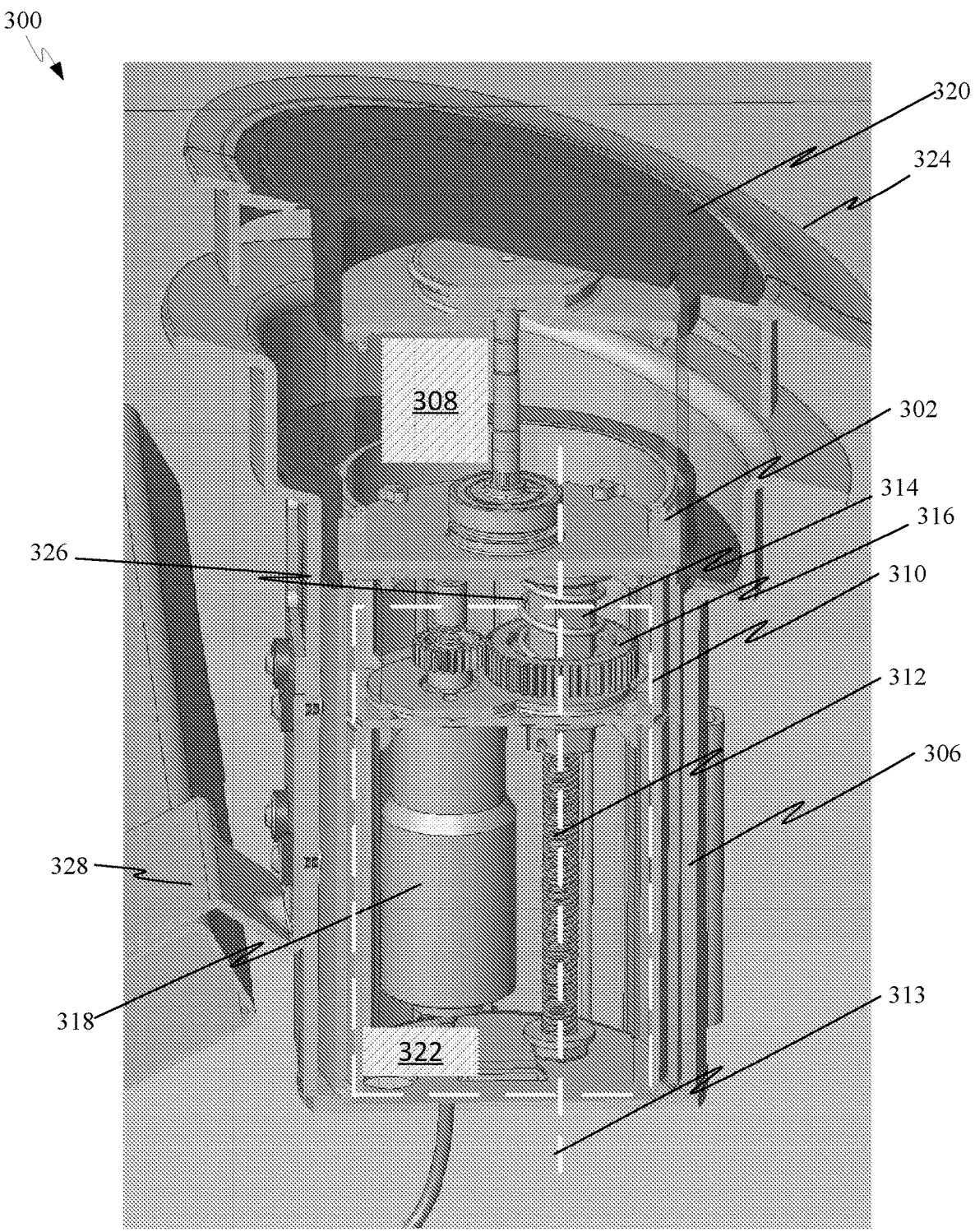
FIGS. 3A-3D illustrate a sensor platform according to certain embodiments.
Figure 3B:
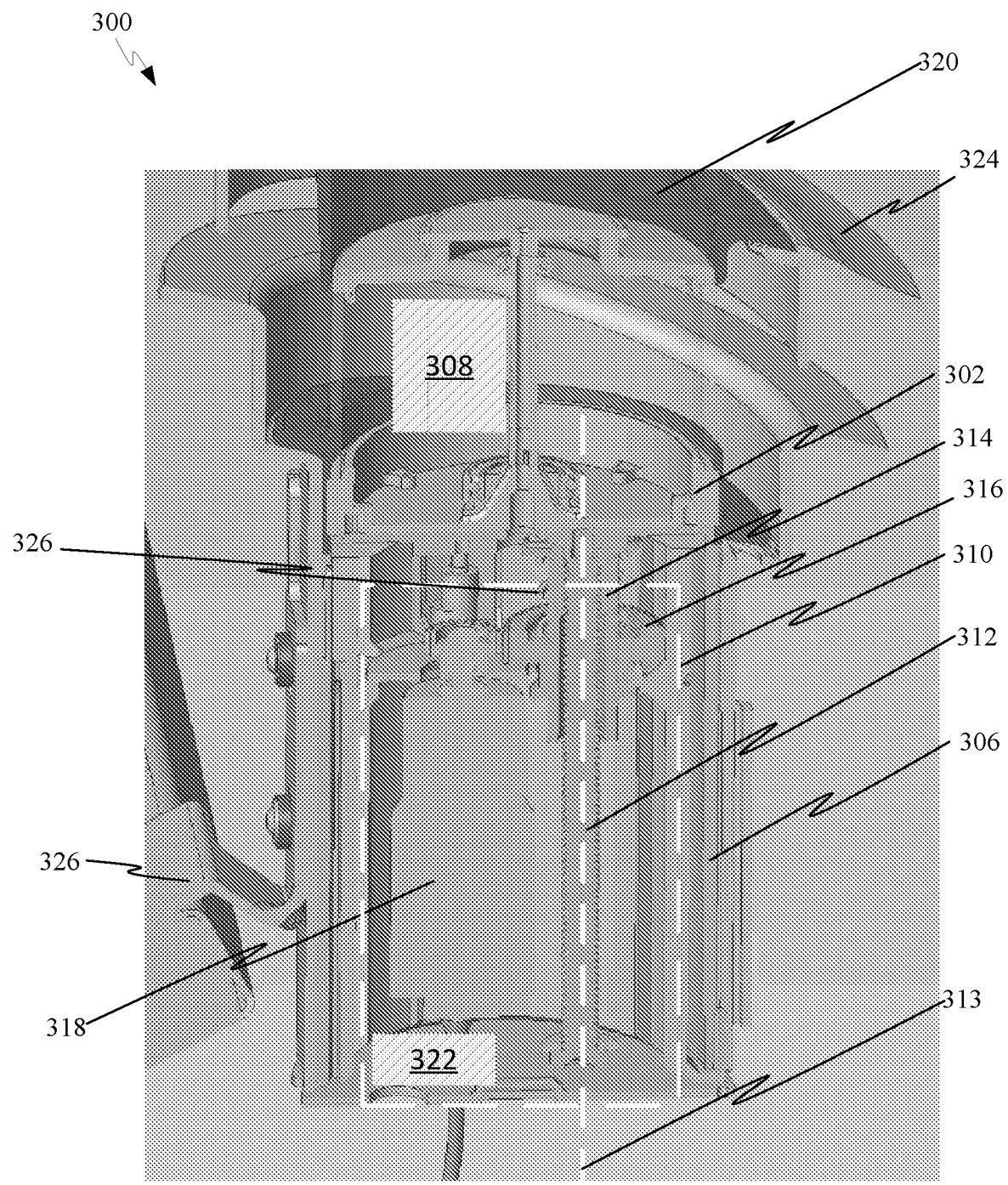

FIGS. 3A and 3B illustrate a state of system 300 wherein sensor 308 and element 302 are retracted from a vehicle inhibit capture, by sensor 308, of one or more propagated waves or other information operable to locate object(s) external to a vehicle including system 300. The state of system 300 illustrated by FIGS. 3A and 3B can correspond to the state of system 200 illustrated by FIG. 2B. As illustrated in FIG. 3A, motor 318 has been commanded to position sensor 308 at the illustrated spatial location. One or more sensors 322 can be used to determine an axial position of element 302 (or other elements of system 300). For example, a rotary encoder, optical encoder, resistive, distance, or other sensor can be used to determine a location of element 302 and/or sensor 308. FIG. 3B illustrates a cut-away view of system 300 in the state illustrated in FIG. 3A in order to better accentuate certain features regarding thread and gear interactions.

Figure 3C:
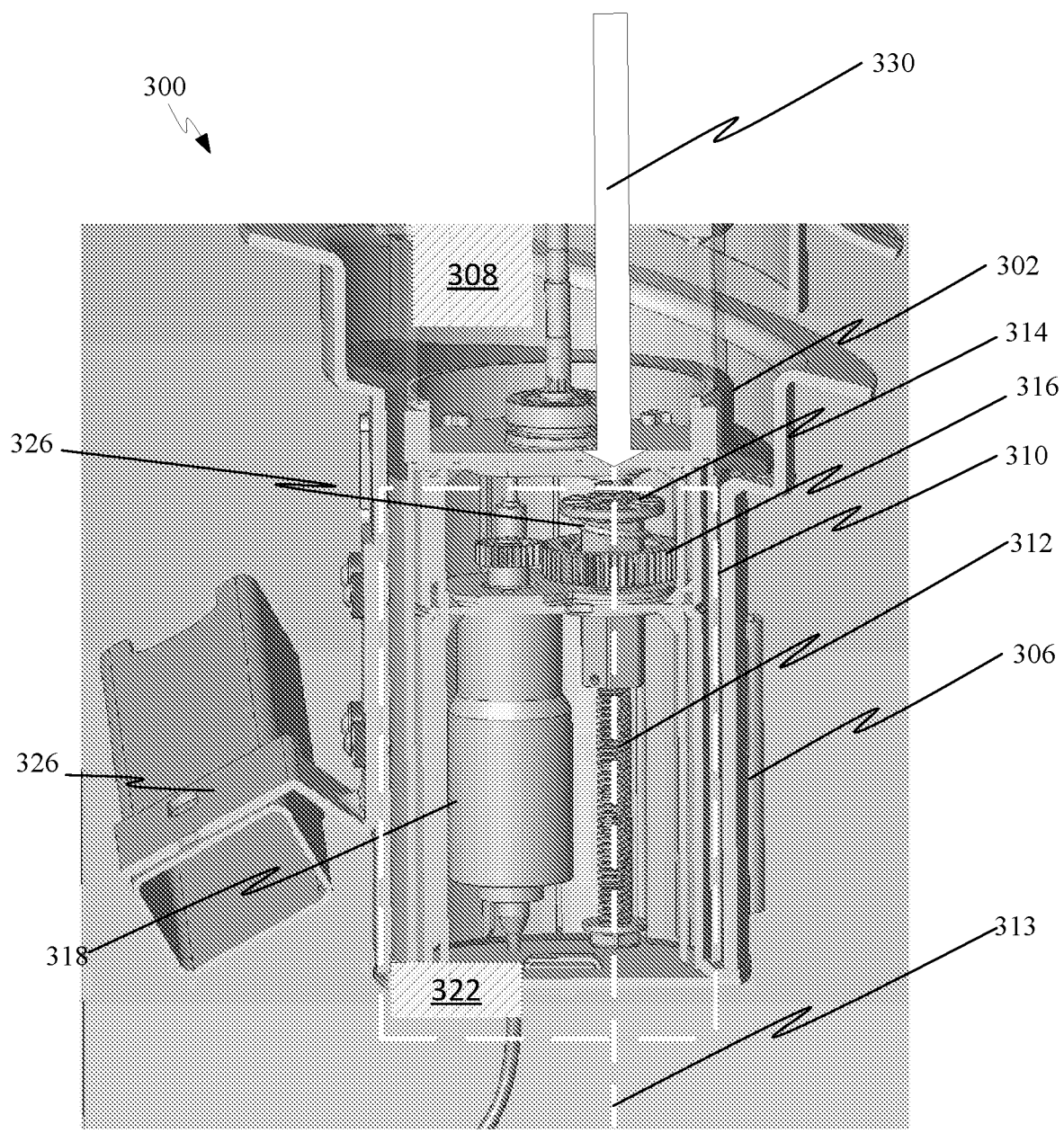
Figure 3D:
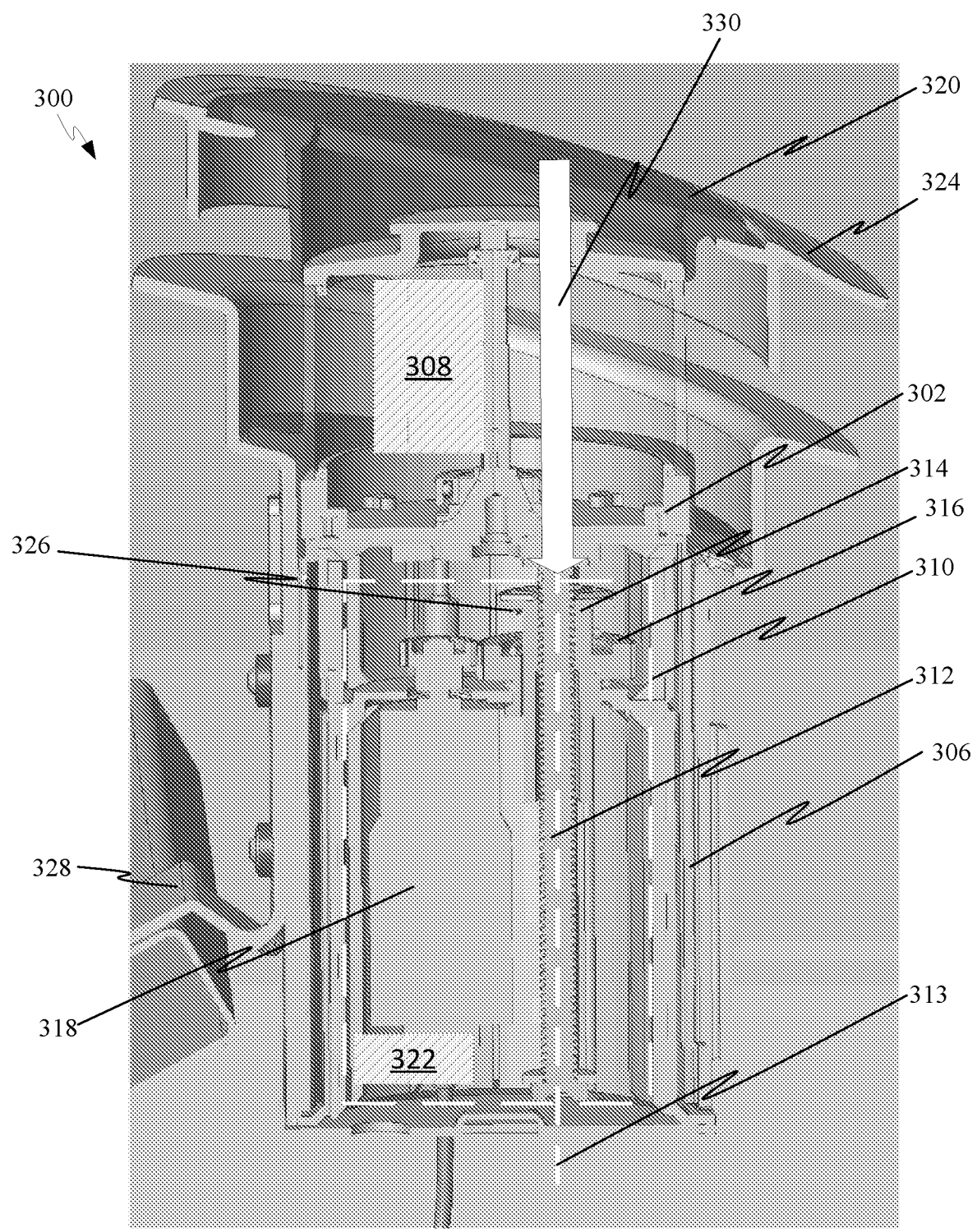

FIGS. 3C and 3D illustrates a state of system 300 wherein intermediate threaded member 314 has moved translationally along axis of elongation 313 relative to tertiary member 316. For example, if a force is applied to system 300 in the direction indicated by arrow 330, the coupling between intermediate threaded member 314 and tertiary member 316 can allow the intermediate threaded member 314 to slide relative to tertiary member 316 in the direction indicated by arrow 324. A force can be applied by impact with a pedestrian, objects exterior to a vehicle, and/or by an actuator. FIG. 3D illustrates a cutaway view of the state of system illustrated by FIG. 3C. Applique 320 can be configured to form an exterior portion of a vehicle body. Seal 324 can provide a weather-proof coupling between system 300 and a hood or other exterior portion of the vehicle.

In certain embodiments, element 302 can move upon application of force in direction of arrow 324. When element 302 moves, sensor 308, elongated threaded member 312, and/or intermediate threaded member 314 can also move along axis of elongation 313. A biasing unit 326 can be used to return element 302, sensor 308, elongated threaded member 312, and/or intermediate threaded member 314. In certain embodiments, biasing unit 326 can bias intermediate threaded member 314 with tertiary member 316 to respective position(s) wherein an outer surface of intermediate threaded member 314 is coupled to an inner surface of tertiary member 316 to enable intermediate threaded member 314 and tertiary member 316 to rotate in unison. Biasing unit 326 can be configured to return intermediate threaded member 314 and/or tertiary member 316 to relative positions wherein rotation of tertiary member 316 can induce rotation of intermediate threaded member 314 to move element 302 or sensor 308 translationally along axis of elongation 313.

In certain embodiments, a system (such as system 200 or system 300) can be mounted to a vehicle and/or be include features to sacrificially and destructively deform upon impact of a force to the system. For example, a system can be mounted to a frame of a vehicle via screws or other components that destructively sheer upon application of a force greater than a threshold. The threshold can be selected to prevent other features of the system for destructively deforming. For example, a sensor or other component may, upon application of a force, destructively deform and form shrapnel or jagged edges that may damage a pedestrian or external object. Sacrificial features, as described herein, can be configured to destructively deform prior to other components of the system to avoid creation of the unsafe conditions described. For example, an element, as disclosed herein, can be separated from a vehicle or vehicle component to which the element is mounted while at least partially encapsulating other components of a system. FIGS. 3A-3D illustrate an example sacrificial mount 328.

In certain embodiments, a system for extending a sensor for use with navigation and/or autonomous driving of a vehicle can include one or more seals to form a weather proof barrier between the system and one or more vehicle components that the system interfaces with. For example, in certain embodiments, a system can include one or more elements that extend through an orifice defined by a hood of a car. As such, a seal can be flexible to minimize water infiltration from between the system and the vehicle hood (or other vehicle body component). In certain embodiments, a vehicle hood or other body panel can form a component of a pedestrian protection system. For example, if an impact with a pedestrian or external object is determined to be imminent, a vehicle can deploy a hood or panel(s) to cushion or dampen impact with a pedestrian. If so, a seal between certain embodiments and the surrounding body panels that may be deployed can be configured to enable the body panel to be deployed substantially unhindered. Furthermore, various seals(s) can be configured to enable a hood or other component of a vehicle to be moved from around a disclosed system. For example, a disclosed system can protrude from a hood of a vehicle. A seal can be configured to enabled the hood to be opened for access underneath without destructively damaging the seal, the system, or the hood.

In certain embodiments, elongated threaded member 312 can include a stopper feature 322. Stopper feature 322 can be configured to prevent intermediate threaded member 314 from decoupling from tertiary threaded member 316. For example, stopper feature can provide a mechanical coupling between elongated threaded member 312 and tertiary member 316 to prevent biasing unit 326 from inducing intermediate threaded member 314 from losing mechanical coupling with tertiary member 316. For example, stopper feature 322 may prevent biasing unit 326 from induce intermediate threaded member 314 and/or elongated threaded member 314 to overextend in a direction of the axis of elongation 313. In certain embodiments, stopper feature 322 may prevent an external force from overextending intermediate threaded member 314 and/or elongated threaded member 314.

Figure 4:
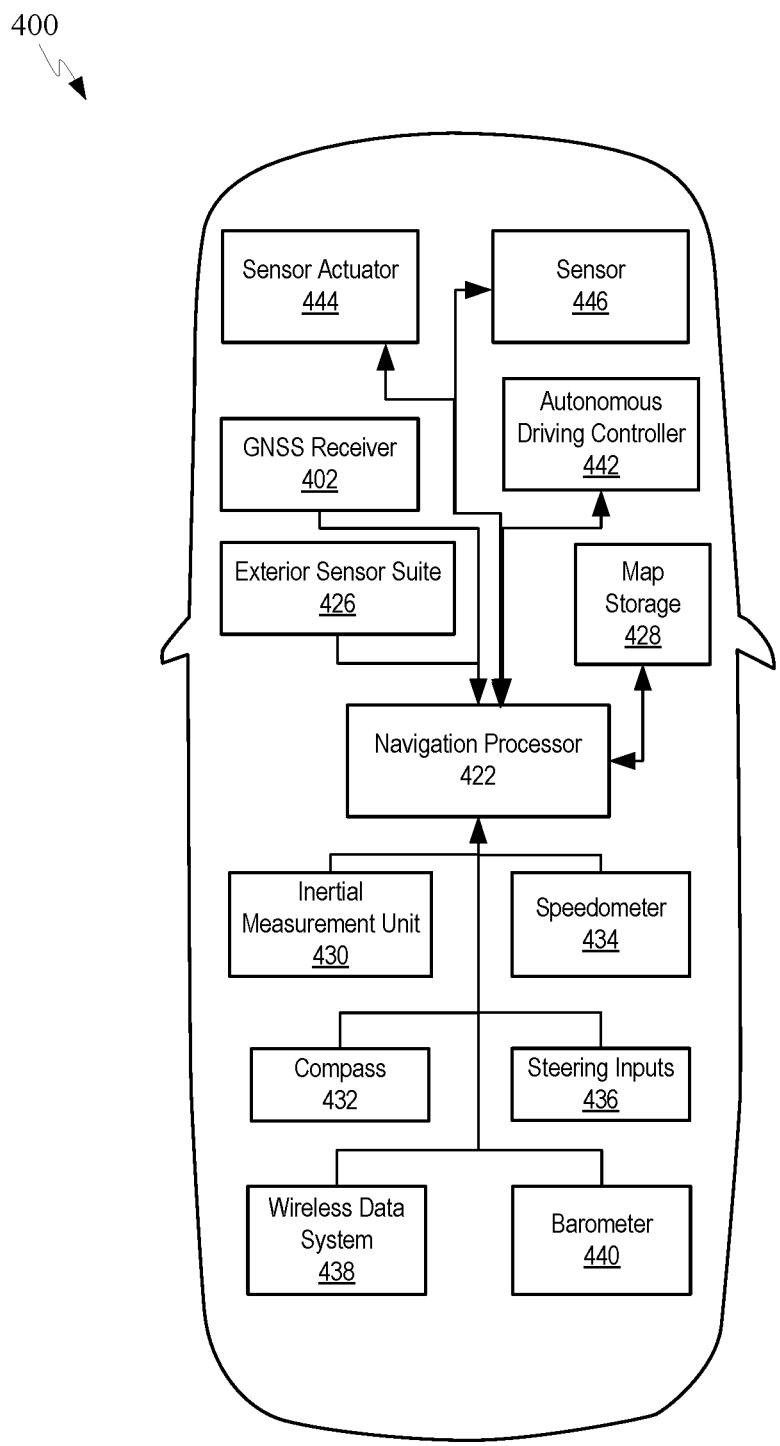
FIG. 4 illustrates various subsystems of a vehicle navigation and/or automation system according to certain embodiments.

FIG. 4 illustrates various example system components configured to provide sensor readings to a navigation processor responsible for tracking navigation of vehicle 400. Vehicle 400 can be similar to vehicle 100. Navigation processor 422 can receive its primary input from GNSS receiver 402. These primary inputs can be augmented or in certain instances replaced by an input or collection of inputs from the other depicted components. Sensor readings received from exterior sensor suite 426, which can represent sensors described in conjunction with FIGS. 1A-1B, can be correlated with information stored in map storage 428 to produce higher resolution and/or more up to date information than what is otherwise available in map storage 428. In some instances, navigation processor 422 can direct store the updated information to map storage 428. Alternatively or additionally, where the detected feature appears to be temporary in nature, e.g. for construction or a detour, the information can be placed in a temporary storage location or not stored at all.

FIG. 4 also depicts inertial measurement unit (IMU) 430. IMU 430 can be configured to track the position of vehicle 400 based on acceleration and/or deceleration applied to vehicle 400. IMU 430 can be utilized in conjunction with data provided by GNSS receiver 402 to precisely track the location of vehicle 400. For example, in locations in which GPS coverage is poor. IMU 430 can also be configured to provide more instantaneous position updates for vehicle 400 as inputs from GNSS receiver 402 can suffer from slight time delay when vehicle 400 is in motion and particularly when undergoing acceleration or deceleration. In some embodiments, IMU 430 can take the form of accelerometer and gyroscope sensors. In some embodiments, IMU 430 can include a laser ring gyroscope or fiber optic gyros. In some embodiments, IMU 430 can include a MEMS accelerometer and/or gyroscope.

FIG. 4 also depicts compass 432. Compass 432 can take the form of a magnetometer configured to provide a direction in which vehicle 400 is travelling/facing. In some embodiments, inputs from compass 432 can be used to orient vehicle 400 in a navigation display of vehicle 400. Speedometer 434 can be used as another tool to determine a position of vehicle 400. For example, on a highway, bridge or tunnel speedometer 434 can be used to determine a position of vehicle 400 when navigational inputs from GNSS receiver 402 become unreliable. For example, in a tunnel a speedometer can be highly accurate in determining position when GNSS Receiver 402 can no longer receive updates from any navigation satellites. In such a case, speedometer position estimation can be used to confirm the performance of IMU 430. This confirmation can be helpful in confirming the accuracy of IMU 430 as inertial measurement units can be subject to drift over time. Wireless data signal system 438, which can be primarily configured to act as a conduit for moving networked data into and out of vehicle 400 can also be configured to use Wi-Fi and/or cellular data signals to determine a location of vehicle 400. That location information can be determined by triangulation of the wireless signals received and sent to navigation processor 422. Vehicle 400 can also include barometer 440. Barometer 440 can be useful in determining an elevation of vehicle 400 above the ground and rate of change in elevation. Finally, an autonomous or semi-autonomous driving controller 442 can be in two-way communication with navigation processor 422. This allows autonomous systems such as adaptive speed control and lane control systems synced with information synced to the navigation system. Autonomous driving controller 442 and/or navigation processor 422 can be coupled to sensor actuator 444 and/or sensor 446. Sensor 446 can be similar to sensor 208 or 308. Sensor actuator 444 can be similar to actuator 212 or 214.

Figure 5:
FIG. 5 illustrates a flowchart including features of the disclosure.
Figure 5:
Figure 5:
Figure 5:
Figure 5:

FIG. 5 illustrates a flowchart 500 for implementing techniques of the disclosure. At 502, an indication can be received to extend a navigation sensor. The indication can be received by a processor, controller unit, or equivalent of a vehicle. The indication can be indicative of the vehicle entering an autonomous or semi-autonomous driving mode. At 504, an element of a sensor system can be induced to move to a first spatial location wherein the sensor is operable to detection information external to the vehicle for use in navigation or autonomous driving. Movement of the sensor can be induced via an actuator as disclosed herein. At 508, an indication can be received to retract the navigation sensor. The indication to retract the navigation sensor can be indicative of a user disabling autonomous driving or navigation or that impact with an object (such as another vehicle or a pedestrian) is imminent. At 510, the sensor can be retracted, such as through use of an actuator.

Figure 6:
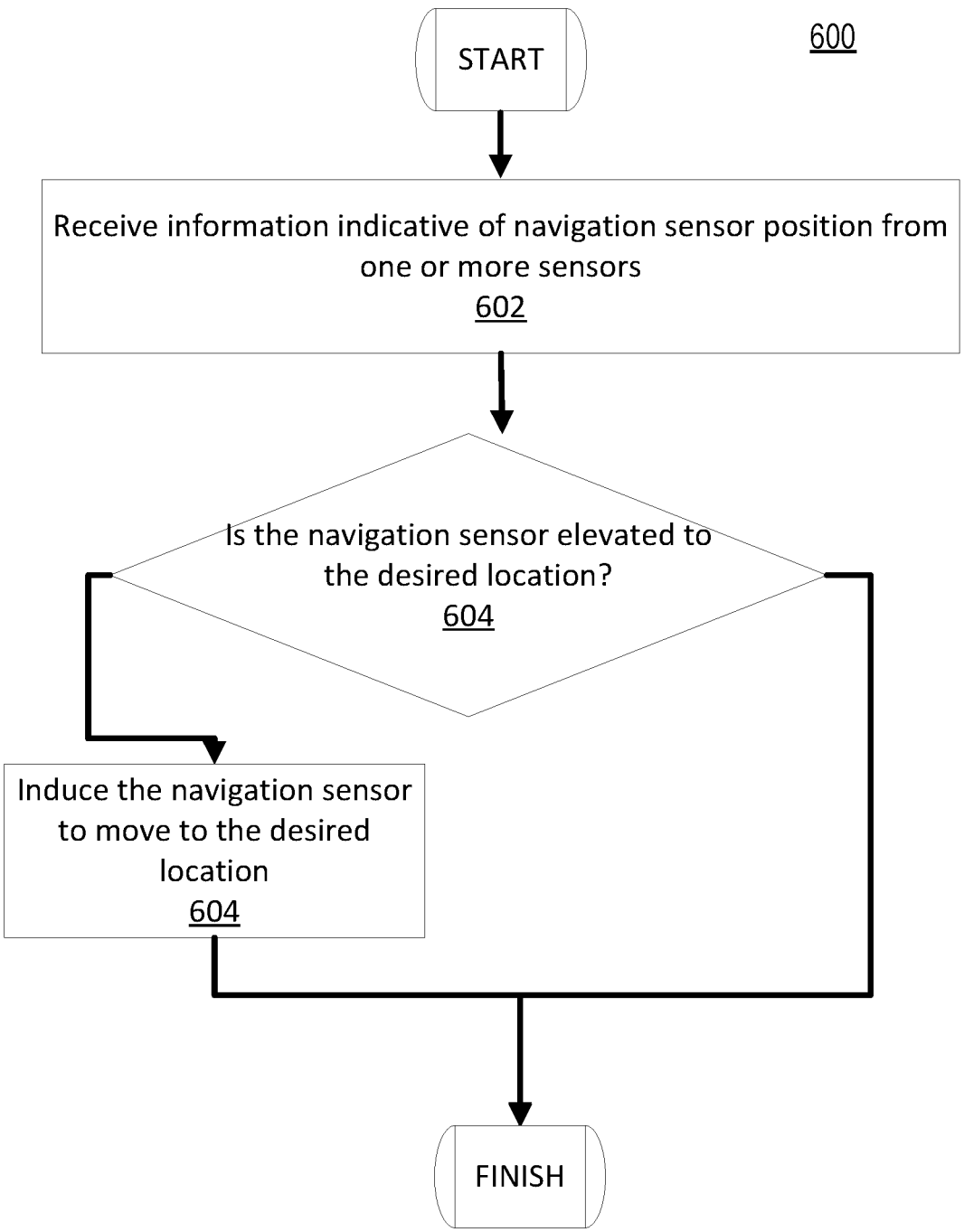
FIG. 6 illustrates a flowchart including features of the disclosure.

FIG. 6 illustrates a flowchart 600 illustrating techniques for positioning a sensor at a desired location. In certain embodiments, a compressible fluid actuator may be implemented using techniques of flowchart 600. At 602, information can be received indicative of a position of a sensor, such as sensor 208 or 308. The information can be received by an optical encoder, ranging sensor, or other. The sensor can be coupled to an element, such as elements 202, 204, 206, 302, or 306, for example. The position may indicate a distance by which the sensor is extended from or retracted into the vehicle. At 604, a determination can be made whether the navigation time, change in volume due compositional breakdown, minor leaks, etc. As such, a sensor may, over time, drift from a desired location. Using sensor readings, as disclosed herein, a controller or other device can include a feedback loop to actively position the sensor at a desired location and make adjustments accordingly. At 606, the navigation sensor can be induced to move to the desired location by commanding an actuator to reposition the sensor, for example.

Figure 7:
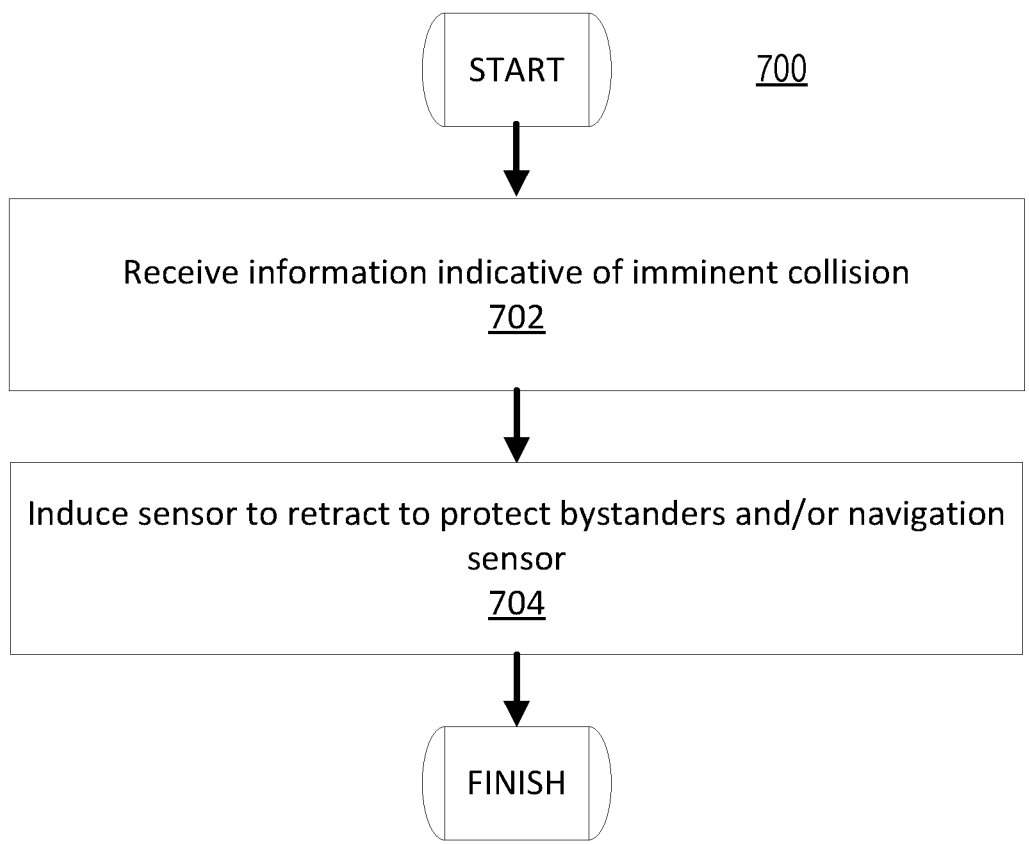
FIG. 7 illustrates a flowchart including features of the disclosure.

FIG. 7 illustrates a flowchart 700 illustrating techniques of the disclosure. At 702, information can be received indicating that a collision is imminent. The information can be determined via one or more sensors of a vehicle, crowd sourced, indicated by a user of the vehicle, and/or otherwise obtained. At 704, a sensor can be induced to retract to protect the sensor, pedestrian bystanders, or other objects. For example, element 202 can be actuated into element 204 and/or element 302 can be actuated into element 306. The rate at which the actuation occurs for protection can be greater than a rate associated with normal actuation of the sensor. For example, a spring loaded, vacuum, or other mechanism can be induced to retract the sensor.

Figure 8:
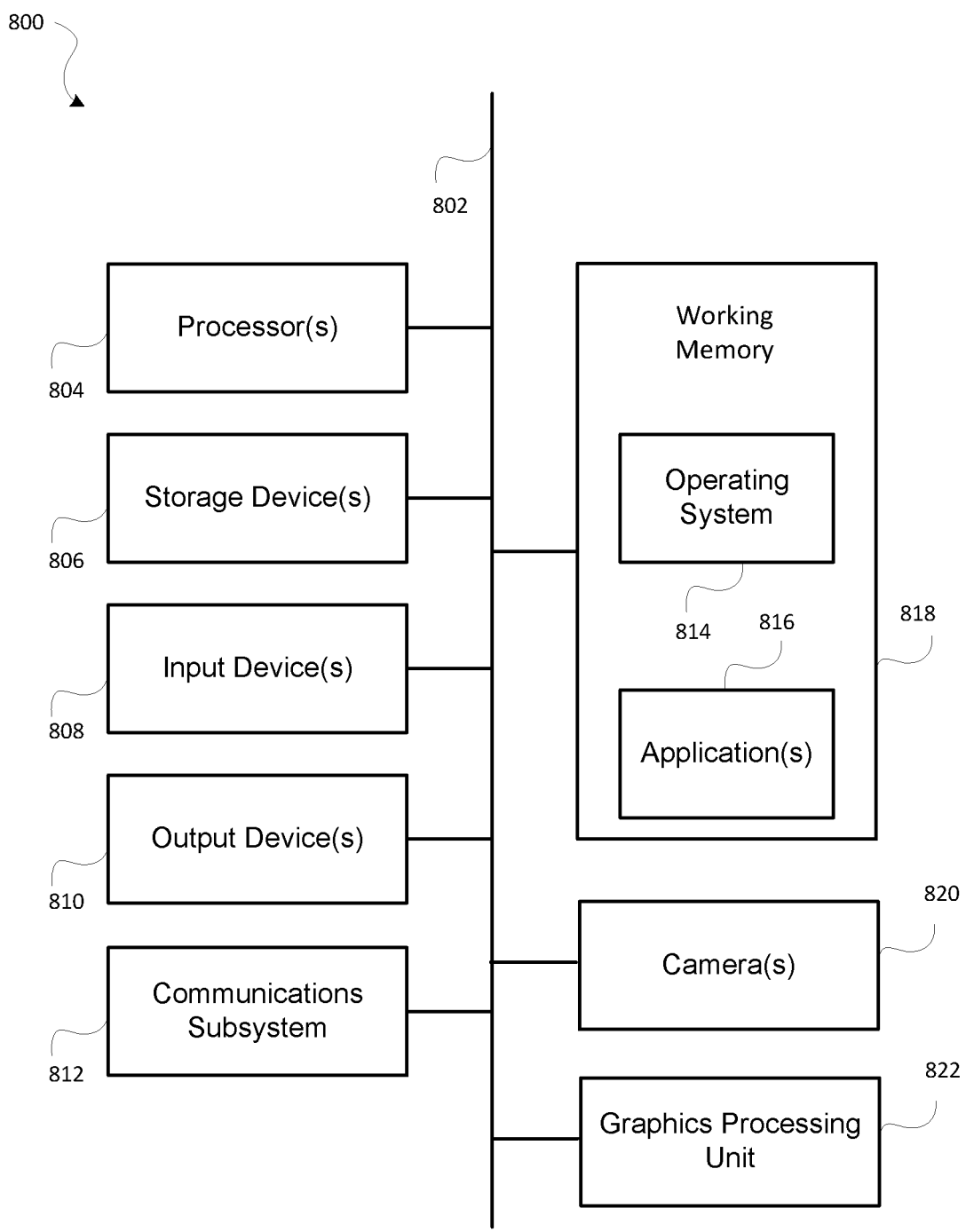
FIG. 8 illustrates an example of a computing system in which one or more embodiments may be implemented, according to embodiments of the present disclosure.

FIG. 8 illustrates an example of a computer system 800 in which one or more implementations may be implemented. Computer system 800 can be implemented in an automobile, such as vehicle 400 shown in FIG. 4. Computing system 800 may include one or more image capture devices, input sensory units, and/or user output devices. An image capture device or input sensory unit may be a camera device. A user output device may be a display unit. Examples of a computing device include but are not limited to electronic control units/modules, infotainment consoles, video game consoles, tablets, smart phones and any other hand-held devices. FIG. 8 provides a schematic illustration of one implementation of a computer system 800 that can perform the methods provided by various other implementations, as described herein. FIG. 8 is meant only to provide a generalized illustration of various components, any or all of which may be utilized as appropriate. FIG. 8, therefore, broadly illustrates how individual system elements may be implemented in a relatively separated or relatively more integrated manner.

The computer system 800 is shown comprising hardware elements that can be electrically coupled via a bus 802 (or may otherwise be in communication, as appropriate). The hardware elements may include one or more processors 804, including without limitation one or more general-purpose processors and/or one or more special-purpose processors (such as digital signal processing chips, graphics processing units 822, and/or the like); one or more input devices 808, which can include without limitation one or more cameras, sensors, a mouse, a keyboard, a microphone configured to detect ultrasound or other sounds, and/or the like; and one or more output devices 810. Input devices 808 and output devices 810 coupled to the processors may form multi-dimensional tracking systems.

The computer system 800 may further include (and/or be in communication with) one or more non-transitory storage devices 806, which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

The computer system 800 might also include a communications subsystem 812, which can include without limitation a modem, a network card (wireless or wired), an infrared communication device, a wireless communication device and/or chipset (such as a Bluetooth device, an 802.11 device, a WiFi device, a WiMax device, cellular communication facilities, etc.), and/or the like. The communications subsystem 812 may permit data to be exchanged with a network, other computer systems, and/or any other devices described herein. In many implementations, the computer system 800 will further comprise a non-transitory working memory 818, which can include a RAM or ROM device, as described above.

The computer system 800 also can comprise software elements, shown as being currently located within the working memory 818, including an operating system 814, device drivers, executable libraries, and/or other code, such as one or more application programs 816, which may comprise computer programs provided by various implementations, and/or may be designed to implement methods, and/or configure systems, provided by other implementations, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a computer-readable storage medium, such as the storage device(s) 806 described above. In some cases, the storage medium might be incorporated within a computer system, such as computer system 800. In other implementations, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which may be executable by the computer system 800 and/or might take the form of source and/or installable code, which, upon compilation and/or installation on the computer system 800 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed. In some implementations, one or more elements of the computer system 800 may be omitted or may be implemented separate from the illustrated system. For example, the processor 804 and/or other elements may be implemented separate from the input device 808. In one implementation, the processor may be configured to receive images from one or more cameras that are separately implemented. In some implementations, elements in addition to those illustrated in FIG. 8 may be included in the computer system 800.

Some implementations may employ a computer system (such as the computer system 800) to perform methods in accordance with the disclosure. For example, some or all of the procedures of the described methods may be performed by the computer system 800 in response to processor 804 executing one or more sequences of one or more instructions (which might be incorporated into the operating system 814 and/or other code, such as an application program 816) contained in the working memory 818. Such instructions may be read into the working memory 818 from another computer-readable medium, such as one or more of the storage device(s) 806. Merely by way of example, execution of the sequences of instructions contained in the working memory 818 might cause the processor(s) 804 to perform one or more procedures of the methods described herein.

The terms "machine-readable medium" and "computer-readable medium," as used herein, refer to any medium that participates in providing data that causes a machine to operate in a specific fashion. In some implementations implemented using the computer system 800, various computer-readable media might be involved in providing instructions/code to processor(s) 804 for execution and/or might be used to store and/or carry such instructions/code (e.g., as signals). In many implementations, a computer-readable medium may be a physical and/or tangible storage medium. Such a medium may take many forms, including but not limited to, non-volatile media, volatile media, and transmission media. Non-volatile media include, for example, optical and/or magnetic disks, such as the storage device(s) 806. Volatile media include, without limitation, dynamic memory, such as the working memory 818. Transmission media include, without limitation, coaxial cables, copper wire and fiber optics, including the wires that comprise the bus 802, as well as the various components of the communications subsystem 812 (and/or the media by which the communications subsystem 812 provides communication with other devices). Hence, transmission media can also take the form of propagated waves (including without limitation radio, acoustic and/or light waves, such as those generated during radio-wave and infrared data communications).

Common forms of physical and/or tangible computer-readable media include, for example, a floppy disk, a flexible disk, hard disk, magnetic tape, or any other magnetic medium, a CD-ROM, any other optical medium, punch-cards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code.

Various forms of computer-readable media may be involved in carrying one or more sequences of one or more instructions to the processor(s) 804 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 800. These signals, which might be in the form of electromagnetic signals, acoustic signals, optical signals and/or the like, are all examples of carrier waves on which instructions can be encoded, in accordance with various implementations of the invention.

The communications subsystem 812 (and/or components thereof) generally will receive the signals, and the bus 802 then might carry the signals (and/or the data, instructions, etc. carried by the signals) to the working memory 818, from which the processor(s) 804 retrieves and executes the instructions. The instructions received by the working memory 818 may optionally be stored on a non-transitory storage device 806 either before or after execution by the processor(s) 804.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Moreover, nothing disclosed herein is intended to be dedicated to the public.

While some examples of methods and systems herein are described in terms of software executing on various machines, the methods and systems may also be implemented as specifically-configured hardware, such as field-programmable gate array (FPGA) specifically to execute the various methods. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example computer-readable storage media, that may store instructions that, when executed by the processor, can cause the processor to perform the steps described herein as carried out, or assisted, by a processor. Examples of computer-readable media may include, but are not limited to, an electronic, optical, magnetic, or other storage device capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code for carrying out one or more of the methods (or parts of methods) described herein.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

Although the disclosure has been described with respect to specific embodiments, it will be appreciated that the disclosure is intended to cover all modifications and equivalents within the scope of the following claims.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling operations of a navigation system or as computer readable code on a computer readable medium for controlling the operation of an automobile in accordance with a navigation route. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A device for extending a sensor platform for a vehicle, comprising:
    an elongated threaded member characterized by an axis of elongation, wherein a thread of the elongated threaded member at least partially circumvents the axis of elongation;
    an intermediate threaded member including a thread mechanically engaged with the thread of the elongated threaded member, wherein the thread of the intermediate threaded member is substantially complementary to the thread of the elongated threaded member;
    wherein, when the intermediate threaded member is rotated, the elongated threaded member translationally moves along the axis of elongation relative to the intermediate threaded member when the intermediate threaded member is held captive from moving translationally in a direction parallel to the axis of elongation;
    and wherein, when a translational force is applied to the elongated threaded member in the direction parallel to the axis of elongation, both of the elongated threaded member and the intermediate threaded member displace, relative to the vehicle, translationally in the direction parallel to the axis of elongation.

2. The device of claim 1, further comprising a tertiary member including a surface that is configured to engage a surface of the intermediate threaded member, wherein the surface of the tertiary member is complementary to the surface of the intermediate threaded member.

3. The device of claim 2, wherein the when the translational force is applied to the elongated threaded member in the direction parallel to the axis of elongation, the tertiary member displaces, relative to the intermediate threaded member, translationally in the direction parallel to the axis of elongation.

4. The device of claim 3, wherein, when the intermediate threaded member is rotated, the tertiary member rotates substantially unitarily with the intermediate threaded member.

5. The device of claim 1, wherein the intermediate threaded member includes an inner surface that defines an orifice through which the elongated member can pass to engage the thread of the elongated threaded member with the thread of the intermediate threaded member.

6. The device of claim 2, wherein the tertiary member includes an inner surface that defines an orifice through which the intermediate threaded member can pass to engage the surface of the elongated threaded member with the surface of the intermediate threaded member.

7. The device of claim 2, further comprising a biasing element configured to bias the tertiary member relative to the intermediate threaded member in the direction parallel to the axis of elongation to engage the surface of the intermediate threaded member with the surface of the tertiary member.

8. The device of claim 1, wherein the elongated threaded member is coupled to a platform including a sensor operable to provide information for autonomous navigation of the vehicle.

9. The device of claim 1, wherein the device includes an applique configured to form a portion of an exterior surface of the vehicle when the elongated threaded member is moved to a spatial location relative to the vehicle in the direction parallel to the axis of elongation.

10. The device of claim 1, further comprising: a sacrificial element wherein, when the application of the force to the elongated threaded member in the direction parallel to the axis of elongation exceeds a threshold, the sacrificial element destructively deforms prior to destructive deformation of other components of the device.

11. The device of claim 10, further comprising a biasing element configured to bias the elongated threaded member to a spatial location relative to the vehicle in the direction parallel to the axis of elongation when the force to the elongated threaded member in the direction parallel to the axis of elongation does not exceed the threshold.

12. The device of claim 2, further comprising a motor coupled to the intermediate threaded member and configured to rotate the tertiary member around an axis parallel to the axis of elongation.

13. The device of claim 1, wherein the thread of the elongated threaded member and the thread of the intermediate threaded member form respective complementary spirals in a direction parallel to the axis of elongation.

14. The device of claim 1, further comprising a sensor configured to sense a physical property corresponding to a degree of extension of the elongated threaded member along the axis of elongation.

15. The device of claim 2, wherein a cross-sectional shape formed by the surface of the intermediate threaded member is polygonal.

16. The device of claim 14, further comprising a controller configured to extend or retract the elongated threaded member along the axis of elongation based on the degree of extension of the elongated threaded member determined via the sensor.

17. A device for elevating a sensor platform for an automobile, comprising:
    a means to rotate an intermediate threaded member that at least partially surrounds an elongated threaded member characterized by an axis of elongation;
    a means to, upon rotation of the intermediate threaded member, extend the elongated threaded member in a direction along the axis of elongation; and
    a means to, upon application of a force to the elongated threaded member in a direction along the axis of elongation, displace both the elongated threaded member and the intermediate threaded member, relative to the vehicle, translationally in the direction parallel to the axis of elongation.

18. The device of claim 17, further comprising a means to bias the means to extend the elongated threaded member to be coupled to the means to rotate the intermediate threaded member.

19. The device of claim 18, wherein the means to bias the elongated threaded member to be coupled to the means to rotate the intermediate threaded member couples the means to extend the elongated threaded member to the means to rotate the intermediate threaded member when the force is applied to the elongated threaded member in a direction along the axis of elongation that does not meet a threshold.

20. The device of claim 19, further comprising a means to destructively decouple the device from an exterior element if the force meets the threshold.

* * * * *